United States Patent
Kratz et al.

[19]

[11] Patent Number: 6,029,800
[45] Date of Patent: Feb. 29, 2000

[54] CONVEYOR FOR ARTICLES WITH WAVE-SHAPED ROLLERS

[75] Inventors: Helmut Kratz, Rodgau; Werner Jahns, Seligenstadt; Edgar Bonifer, Münster, all of Germany

[73] Assignee: Mannesmann Aktiengesellschaft, Dusseldorf, Germany

[21] Appl. No.: 09/227,019

[22] Filed: Jan. 7, 1999

[30] Foreign Application Priority Data

Jan. 15, 1998 [DE] Germany .......................... 198 01 823

[51] Int. Cl.$^7$ ................................................. B65G 23/04
[52] U.S. Cl. ............................................ 198/835; 198/842
[58] Field of Search ................................... 198/817, 835, 198/840, 842; 193/37

[56] References Cited

U.S. PATENT DOCUMENTS

| | | |
|---|---|---|
| 3,122,935 | 3/1964 | Morling . |
| 3,808,658 | 5/1974 | Looney ................................ 198/840 |
| 4,140,216 | 2/1979 | Conrad ................................ 198/835 |
| 5,213,202 | 5/1993 | Arnold ................................ 198/835 |

FOREIGN PATENT DOCUMENTS 1177913  9/1964  Germany .

OTHER PUBLICATIONS

Ammeraal Brochure, paragraphs 1.1, 1.2, 1.3 and 6.6 translated.
International PCT application, publication No. WO 94/04850, published Mar. 3, 1994, entitled Belt Guide Pulley.
Ammeraal Brochure, entire document.

*Primary Examiner*—James R. Bidwell
*Attorney, Agent, or Firm*—Van Dyke, Garder, Linn & Burkhart, LLP

[57] ABSTRACT

The invention concerns a conveyor for packages, especially a conveyor for flexible packages such as newspapers, textiles or sacks. The conveyor includes a plurality of sequential, parallel and spaced rollers, which form a conveying surface and are perpendicular to a direction of conveyance. Along their length, the rollers have alternating cylindrical sections and narrowing sections. The narrowing sections narrow to both sides of a highest point along the length of the roller toward the cylindrical sections. A plurality of continuous belts are guided around groups of sequential rollers and run in the direction of conveyance to bridge gaps between the spaced rollers. The belts are positioned around the narrowing sections at the maximum diameter thereof. In order to create a conveyor for packages that is less prone to disturbances, it is preferred that the diameters and the widths of the narrowing sections and the cylindrical sections of the rollers be selected in relation to a width and/or thickness of the belts, such that when a belt is deflected by a package from the highest point of the narrowing section toward the cylindrical section, the belt will lose contact with the package as the package remains on the neighboring belts or the highest point of the roller. The belt thus can independently return to the highest point of the narrowing section, as the belt is driven by its continuing contact with the narrowing section, before the belt is deflected to the neighboring narrowing section and after the package is transported further by the conveyor.

10 Claims, 2 Drawing Sheets

CONVEYOR FOR ARTICLES WITH WAVE-SHAPED ROLLERS

BACKGROUND OF THE INVENTION

The invention concerns a conveyor for packages, and, more particularly, a conveyor for form flexible packages such as newspapers, textiles or sacks.

In international patent application WO 94/04850, filed Aug. 16, 1993 and published Mar. 3, 1994, a roller conveyor is disclosed for flexible packages of, for example, washcloths. The roller conveyor essentially consists of numerous parallel, sequential rollers that form an essentially horizontal transport surface for the packages. In order to prevent the flexible packages from falling through, or being drawn through, the spaced, sequential rollers, several narrow, continuously circulating belts are guided around groups of sequential rollers. The gaps between the rollers are hence substantially closed by a network of belts.

The narrow belts are guided by a plurality of double-conical sections positioned along the otherwise cylindrical rollers, thereby remaining parallel and evenly distributed on the rollers. A plurality of conical sections corresponding to the number of belts are distributed along the length of each roller with cylindrical sections therebetween. Because the narrow belts tend to creep up the rising conical surfaces of the double-conical sections, the belts become centered by the opposing rising conical surfaces at the highest point of the adjacent conical surfaces. Therefore, each belt is centered on a plurality of double-conical sections correspondingly positioned along a group of sequential rollers. The cylindrical sections of the rollers between the double-conical sections have a width that is greater than the width of the belts, while the width of the double-conical sections approximately corresponds to the width of the belt.

With this roller conveyor, the belts can be pressed downwardly (especially by the packages) and diverted from the double-conical section toward the cylindrical section. Because the cylindrical section is wider than the belt, the belt is allowed to be further diverted until it fully rests on the cylindrical sections between neighboring conical sections, and remains there, where it does not effectively support the packages. A shoulder between the cylindrical and double-conical sections further prevents the belt from independently creeping back onto the double-conical section. Therefore, in order to properly realign the belts, they must be manually adjusted while the conveyor is running.

SUMMARY OF THE INVENTION

The present invention provides a conveyor for packages, especially flexible packages such as newspapers, textiles or sacks, that requires less manual adjustments and is thus less troublesome than conventional conveyors. This is accomplished by the present invention which provides a conveyor for flexible packages that includes self-adjusting belts.

According to one aspect of the present invention, a conveyor for conveying flexible packages comprises a plurality of sequential, parallel and spaced rollers that form a conveying surface and are perpendicular to a direction of conveyance and a plurality of continuous belts guided around a group of the rollers. Each of the rollers forms a plurality of alternating cylindrical sections and narrowing sections, with each narrowing section having a highest point at a maximum diameter and narrowing to both sides of the highest point along a length of the rollers to a diameter of the cylindrical sections. The diameter of the cylindrical sections being less than the maximum diameter of the narrowing sections. Each belt is guided around the narrowing sections of the group of rollers and runs in the direction of conveyance in order to bridge a gap between each adjacent pair of rollers. The maximum diameter of the narrowing sections, the diameter of the cylindrical sections and a longitudinal width of the narrowing sections are selected in relation to a thickness of at least one of the belts so that when a belt is deflected by a package from the highest point of the narrowing section toward the cylindrical section, the belt loses contact with the package, which remains on at least one of a neighboring belt and the highest point of the narrowing section. The belt independently returns to the highest point of the narrowing section by continuing contact between the belt and the narrowing section before the belt reaches an adjacent narrowing section and after the package is transported further by the conveyor.

In one form, the width of the narrowing sections is at least twice as large as a width of the belts, while the cylindrical sections of the rollers have a width that is less than the width of the belts. The maximum diameter of the narrowing sections is greater than the diameter of the cylindrical sections by at least twice the thickness of the belts.

These and other objects, advantages, purposes and features of this invention will become apparent upon review of the following specification in conjunction with the drawings.

DESCRIPTION OF THE PREFERRED EMBODIMENT

Figure 1:
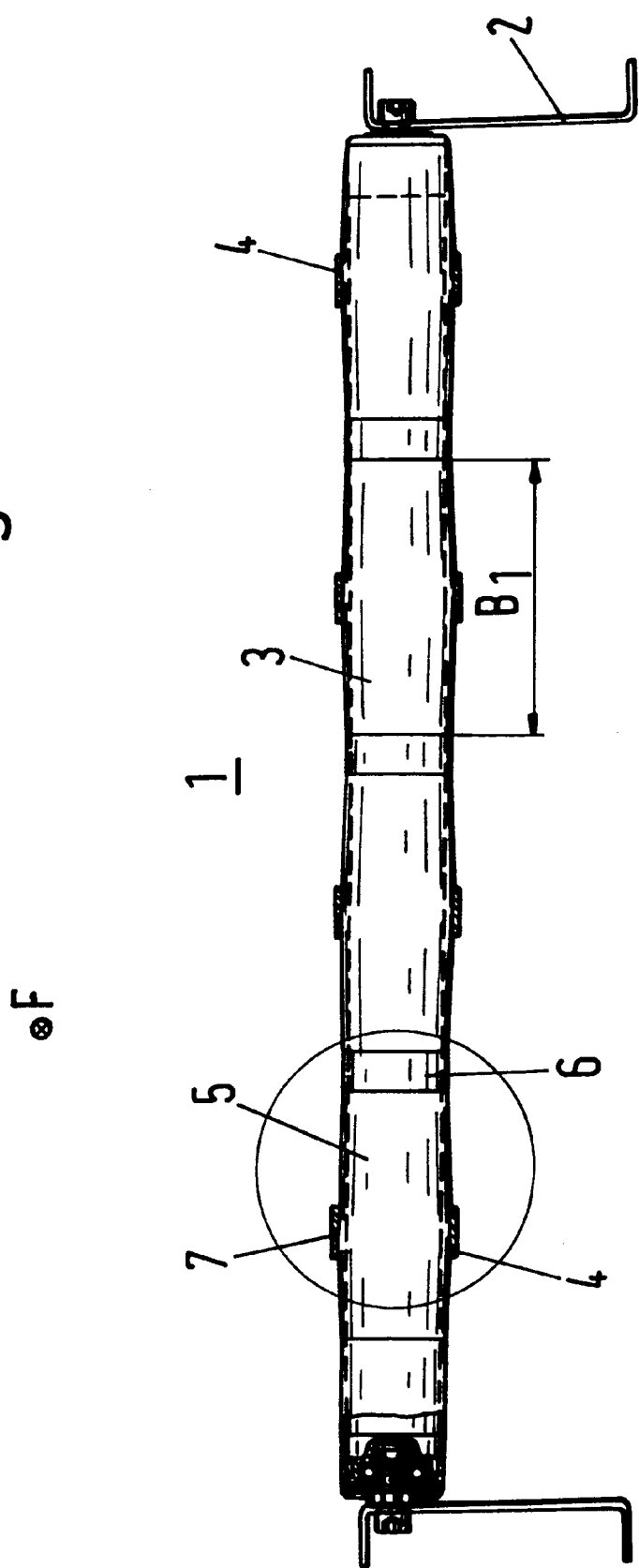
FIG. 1 is a cross-section of a conveyor with a view of the roller with belts.

FIG. 1 shows a cross-section of a conveyor 1 for flexible packages such as newspapers, textiles or sacks. The conveyor 1 essentially consists of two side frames 2 extending in a direction of conveyance F, which is transverse to the rollers and into the plane of the drawing. The side frames 2 are generally upright and U-shaped, with a plurality of rollers 3 mounted therebetween. The rollers 3 are parallel and sequentially spaced apart to form a horizontal conveyance surface and are oriented perpendicular to the direction of conveyance F. In order to prevent flexible packages from falling between the rollers 3, a plurality of continuous, rotating, narrow belts 4 are guided around a group of, for example, six sequential rollers 3. The belts 4 run in the direction of conveyance F, and are spaced along the length of each roller 3. The belts 4 preferably have a rectangular cross-section.

In order to guide the belts 4, narrowing sections 5 are provided on the rollers 3 that narrow to each side in a longitudinal direction along each roller 3 starting from a highest point 7 having a maximum diameter $D_1$ to a diameter $D_2$ of a cylindrical section 6. The narrowing sections are preferably designed as double-conical sections and are separated by the cylindrical sections 6 along the length of the roller 3, such that the narrowing sections 5 and cylindrical sections 6 alternate along the roller 3. The narrowing sections 5 are double-conical sections in that they consist of two conical frustums that abut at their bases. At the abutting frustums, the narrowing section 5 has its greatest diameter $D_1$ which represents the highest point 7 of the conveyance surface. The abutting conical surfaces mirror each other across a vertical plane through the highest point 7 of each narrowing section 5. This design of the narrowing sections 5 allows the belts 4 to independently center themselves at the greatest diameter $D_1$ of the narrowing section 5, since the peripheral speed of the roller 3 is the greatest at this location. This is because the peripheral speed of the roller surface rises gradually along the conical surfaces toward the highest point 7, which causes the belt 4 to travel upward along the conical surfaces of the narrowing section 5 toward the highest point 7. Because the forces acting on the belt 4 from the oppositely sloping conical surfaces of the narrowing sections 5 oppose each other at their abutting bases, the belt then remains at the highest point 7.

The diameters and widths of the sections 5 and 6 are harmonized with the thickness of the belt 4, such that as the belt 4 is diverted by packages from the highest point 7 of the narrowing section 5 toward the cylindrical section 6, the belt 4 loses contact with the package and hence can stabilize while still on the narrowing section 5 before reaching an adjacent narrowing section. After the package is transported further, the belt 4 can independently return to the highest position of the narrowing section 5. The roller conveyor therefore becomes resistant to malfunctions that arise from an external force acting on the belt 4 which is transverse to the direction of conveyance F.

Figure 2:
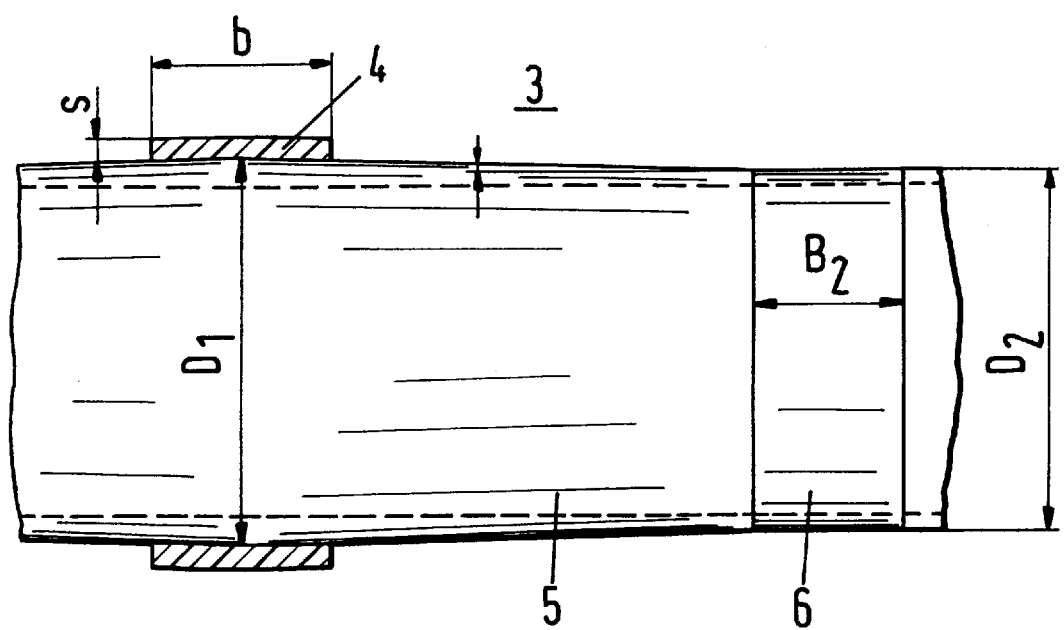
FIG. 2 is an enlarged section of the area II in FIG. 1.

FIG. 2 is an enlarged view of a narrowing section 5 and an adjacent cylindrical section 6 of an individual roller 3. The preferred dimensions of narrowing sections 5 and cylindrical sections 6 in relation to the thickness "s" of the belt 4 will now be explained with reference to this figure. The dimensions are selected so that a belt 4, which is diverted by a package from the highest point 7 of the narrowing section 5 toward the cylindrical section 6, will automatically return to the highest point 7 as the rollers continue to rotate. To accomplish this, the diameter $D_1$ of narrowing section 5 at its highest point 7 is greater than the diameter $D_2$ of the cylindrical section 6 by at least twice the thickness "s" of the belt 4. This allows a package, which has diverted the belt 4 downwardly along one side of the narrowing section 5 toward the cylindrical section 6, to be increasingly supported by the other belts 4 and by the highest point 7 of the now belt-free narrowing section 5, which further allows the package to lose contact with the downwardly diverted belt 4. When the belts 4 are diverted toward the cylindrical sections 6, they move longitudinally along the rollers 3 and downwardly along a downward sloping surface of the narrowing section 5 toward an adjacent cylindrical section. Therefore, as they are further diverted, the belts 4 move low enough below the package to lose contact with the package, while the package is simultaneously being conveyed along the sequential rollers by the neighboring belts of the conveyor. The belt 4 is thus no longer deflected by the package and can stabilize in this position on the narrowing section 5. After the package has left this section of the conveyor, the belt 4 can independently return to the highest point 7 of the narrowing section 5, as the belt 4 will only return to its initial location when the force exerted by the package on the belt 4 is interrupted or reduced by either the belt 4 sliding to a point below the package and/or by the package being conveyed past the belt 4. The preferred dimensions allow the belt 4 to drop below the package before the package can push it further across the cylindrical section 6 toward another neighboring narrowing section. This is ensured by the difference in diameters between the narrowing sections 5 and the cylindrical sections 6. Most preferably, the diameter $D_1$ of the narrowing sections 5 is greater than the diameter $D_2$ of the cylindrical sections 6 by at least 2.5 times the thickness "s" of the belt 4, as the belt 4 then easily drops down enough to provide clearance between the belt 4 and the package.

The self-centering of the narrow belts 4 after they are diverted toward the cylindrical sections 6 is advantageously caused by rollers 3 whose narrowing sections 5 have a width $B_1$ that is preferably at least twice as great as the width b of the belt 4. Most preferably, the width $B_1$ of the narrowing section 5 is at least five times the width b of the belt. During normal operation, the belt 4 remains stable and centered at the highest point 7 of the narrowing sections 5 since the force acting on the belt 4 in the direction of the highest point may be kept low when the slope of the narrowing surfaces is also low. Furthermore, because the belt 4 drops along the narrowing sections 5 when it is diverted by the package, the narrowing sections 5 are preferably wider, as increasing the widths of the narrowing sections 5 increases the distance along which the belt 4 may be diverted (and also increases the time required for the belt 4 to travel the width $B_1$ of the section), so that the influence of the transported package will generally stop before the belt reaches the cylindrical section 6. Because the width $B_1$ of the narrowing section 5 is most preferably much greater that the width b of the belt 4, the belt 4 must be deflected along a relatively long path along the narrowing section 5 toward the cylindrical section 6 before it may be deflected further onto the cylindrical section 6. In order to traverse the narrowing section 5, the belt 4 thus requires a substantial amount of time to pass along the entire width $B_1$. This substantially precludes the belt 4 from traversing the entire width $B_1$, because there is not enough time to do so, as the package diverting or deflecting the belt 4 is simultaneously being conveyed in direction F and soon no longer contacts and diverts the belt 4. The special design of the narrowing sections 5 further ensures that the belt 4 will return to the highest point 7 after it has been deflected by the package.

Furthermore, the cylindrical section 6 has a width $B_2$ that is preferably less than the width b of the belt 4. Because belt 4 cannot fit entirely on the cylindrical section 6 even if it is deflected to the cylindrical section 6, the belt 4 remains in contact with the conical surface of its corresponding narrowing section 5. This prevents a belt 4 that is diverted toward the cylindrical sections 6 from remaining on the cylindrical sections 6 rather than returning to its corresponding narrowing sections 5. The sizes of the cylindrical sections 6 are selected so that a diverted belt 4 retains contact with its corresponding narrowing sections 5, which then provide the force to return the belt to the highest point 7 of the corresponding narrowing sections 5 after the package has been removed from the area. The roller 3 of the present invention thus does not allow the belt 4 to move along the roller onto a cylindrical section 6 to remain there or to continue moving across the cylindrical section 6 and onto an adjacent narrowing section.

The double-conical shape of the narrowing sections 5 has also proved to be advantageous. When the oppositely sloping conical surfaces meet, at the highest point 7, or greatest diameter $D_1$, a radius "r" is preferably provided to steady the rotation and travel of the belt 4 therealong. The radius protects the belt from wear against an edge that would otherwise be present at the transition between the oppositely sloped conical surfaces. A ball design may alternatively be used at the transition between the conical surfaces.

In one exemplary embodiment, the dimensions are as follows: $D_1$=53 mm, $D_2$=49 mm, $B_1$=140 mm, $B_2$=20 mm, b=25 mm and s=1.4 mm. One can see that $D_1$ is greater than $D_2$ by approximately three times the thickness of the belt. However, other dimensions may be provided without affecting the scope of the present invention. Even when packages are flexible, the belt 4 will to the highest point 7 after it has been diverted therefrom.

Changes and modifications in the specifically described embodiments can be carried out without departing from the principles of the invention, which is intended to be limited only by the scope of the appended claims, as interpreted according to the principles of patent law.

The embodiments of the invention is which an exclusive property right or privilege is claimed are defined as follows:

1. A conveyor for conveying flexible packages comprising:

a plurality of sequential, parallel and spaced rollers that form a conveying surface and are generally perpendicular to a direction of conveyance, each of said rollers forming a plurality of alternating cylindrical sections and narrowing sections, said narrowing sections having a highest point at a maximum diameter and narrowing to both sides of said highest point along a length of said roller to a diameter of said cylindrical sections, said diameter of said cylindrical sections being less than said maximum diameter of said narrowing sections; and a plurality of continuous belts guided around said narrowing sections of a group of said plurality of rollers and run in said direction of conveyance to bridge a gap between each adjacent pair of rollers, said maximum diameter of said narrowing sections, said diameter of said cylindrical sections and a longitudinal width of said narrowing sections being selected in relation to a thickness of at least one of said plurality of belts so that when at least one belt is deflected by a package from said highest point of said narrowing section toward said cylindrical section, the deflected belt loses contact with the package, which still remains on at least one of a neighboring belt and said highest point of said narrowing section, the deflected belt independently returning to said highest point of said narrowing section by continuing contact between the deflected belt and said narrowing section before the deflected belt reaches an adjacent narrowing section and after the package is transported further by said conveyor.

2. The conveyor according to claim 1, wherein said width of said narrowing sections of said rollers is at least twice as large as a width of said belts, said cylindrical sections of said rollers having a width that is less than said width of said belts, said maximum diameter of said narrowing sections of said rollers being greater than said diameter of said cylindrical sections by at least twice a thickness of said belts.

3. The conveyor according to claim 2, wherein said width of said narrowing sections of said rollers is at least five times said width of said belt.

4. The conveyor according to claim 3, wherein said maximum diameter of said narrowing sections of said rollers is greater than said diameter of said cylindrical sections of said rollers by at least 2.5 times said thickness of said belts.

5. The conveyor according to claim 4, wherein said belt has a flat, rectangular cross-section.

6. The conveyor according to claim 1, wherein said diameter of said narrowing sections of said rollers is greater than said diameter of said cylindrical sections of said rollers by at least 2.5 times a thickness of said belts.

7. The conveyor according to claim 6, wherein said belt has a flat, rectangular cross-section.

8. The conveyor according to claim 1, wherein said narrowing sections of said rollers are double cones having two oppositely sloping conical surfaces, said conical surfaces transition across a radius at said highest point of said narrowing section.

9. The conveyor according to claim 8, wherein said belt has a flat, rectangular cross-section.

10. The conveyor according to claim 1, wherein said belt has a flat, rectangular cross-section.

\* \* \* \* \*